US009720677B2

(12) United States Patent
Archer et al.

(10) Patent No.: US 9,720,677 B2
(45) Date of Patent: *Aug. 1, 2017

(54) IMPLEMENTING UPDATES TO SOURCE CODE EXECUTING ON A PLURALITY OF COMPUTE NODES

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Matthew R. Weaver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,634

(22) Filed: Jan. 14, 2013

(65) Prior Publication Data

US 2013/0212573 A1     Aug. 15, 2013

Related U.S. Application Data

(63) Continuation of application No. 13/369,879, filed on Feb. 9, 2012.

(51) Int. Cl.
*G06F 9/45* (2006.01)
*G06F 9/445* (2006.01)
*G06F 9/52* (2006.01)

(52) U.S. Cl.
CPC .................. *G06F 8/65* (2013.01); *G06F 8/67* (2013.01); *G06F 9/522* (2013.01)

(58) Field of Classification Search
CPC ....................................................... G06F 8/62
(Continued)

(56) References Cited

U.S. PATENT DOCUMENTS 6,564,215 B1   5/2003   Hsiao et al.
7,032,210 B2   4/2006   Alloing et al.
(Continued)

FOREIGN PATENT DOCUMENTS

WO   2011134689 A1   11/2011

OTHER PUBLICATIONS

International Search Report and Written Opinion of the ISA dated Jun. 25, 2013—International Application No. PCT/IB2013/050983.
(Continued)

*Primary Examiner* — Li B Zhen
*Assistant Examiner* — Lenin Paulino
(74) *Attorney, Agent, or Firm* — Brandon C. Kennedy; Grant A. Johnson; Kennedy Lenart Spraggins LLP

(57) ABSTRACT

Methods, apparatuses, and computer program products for implementing updates to source code executing on a plurality of compute nodes are provided. Embodiments include receiving, by a compute node, a broadcast update-notification message indicating there is an update to the source code executing on the plurality of compute nodes; in response to receiving the update-notification message, implementing a distributed barrier; based on the distributed barrier, halting execution of the source code at a particular location within the source code; based on the distributed barrier, updating in-place the source code including retaining workpiece data in memory of the compute node, the workpiece data corresponding to the execution of the source code; and based on completion of the updating of the source code, resuming with the retained workpiece data execution of the source code at the particular location within the source code where execution was halted.

5 Claims, 8 Drawing Sheets

(58) Field of Classification Search
USPC .................................................. 717/171, 172
See application file for complete search history.

(56) References Cited

U.S. PATENT DOCUMENTS

| | | | |
|---|---|---|---|
| 8,015,558 B1 | 9/2011 | Beloussov et al. | |
| 8,065,671 B1* | 11/2011 | Beker ........................ | G06F 8/67 717/168 |
| 2004/0078481 A1 | 4/2004 | Rudd et al. | |
| 2006/0070058 A1* | 3/2006 | Menahemi ................ | G06F 8/67 717/171 |
| 2007/0168994 A1* | 7/2007 | Barsness et al. ............. | 717/129 |
| 2007/0261049 A1* | 11/2007 | Bankston .................. | G06F 8/65 717/170 |
| 2009/0083405 A1* | 3/2009 | Ashok ....................... | G06F 8/61 709/221 |
| 2009/0150872 A1 | 6/2009 | Russell et al. | |
| 2009/0150878 A1* | 6/2009 | Pathak ...................... | G06F 8/65 717/172 |
| 2010/0031245 A1* | 2/2010 | Meller ....................... | G06F 8/67 717/170 |
| 2010/0205596 A1* | 8/2010 | Chung .................. | H04L 41/082 717/172 |

OTHER PUBLICATIONS

Hicks; "Dynamic Software Updating", Proceedings of the 2001 Conference on Programming Language Design and Implementation (PLDI), Jun. 2001, pp. 1-233, Association for Computing Machinery (ACM), New York, New York, USA.

* cited by examiner

IMPLEMENTING UPDATES TO SOURCE CODE EXECUTING ON A PLURALITY OF COMPUTE NODES

CROSS-REFERENCE TO RELATED APPLICATION

This application is a continuation application of and claims priority from U.S. patent application Ser. No. 13/369,879, filed on Feb. 9, 2012.

BACKGROUND OF THE INVENTION

Field of the Invention

The field of the invention is data processing, or, more specifically, methods, apparatuses, and computer program products for implementing updates to source code executing on a plurality of compute nodes.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can be massively parallel and include many compute nodes within a computing system. Often the same source code is executed on a plurality of compute nodes. To maintain continuity of results, there may be a need to update the source code concurrently on all of the compute nodes. The typical solution is to restart all the compute nodes with the new code and reload the data. For many systems, the delay caused by the reloading of the source code into the compute nodes is unacceptable while at the same time, the source code update is critical.

SUMMARY OF THE INVENTION

Methods, apparatuses, and computer program products for implementing updates to source code executing on a plurality of compute nodes are provided. Embodiments include receiving from a source code updater, by a compute node, a broadcast update-notification message indicating there is an update to the source code executing on the plurality of compute nodes; in response to receiving the update-notification message, implementing, by the computer node, a distributed barrier on the compute node, the distributed barrier controlling implementation of updates to the source code; based on the distributed barrier, halting, by the compute node, execution of the source code at a particular location within the source code; based on the distributed barrier, updating in-place, by the compute node, the source code including retaining workpiece data in memory of the compute node, the workpiece data corresponding to the execution of the source code; and based on completion of the updating of the source code, resuming with the retained workpiece data, by the compute node, execution of the source code at the particular location within the source code where execution was halted.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for implementing updates to source code executing on a plurality of compute nodes in accordance with the present invention are described with reference to the accompanying drawings, beginning with FIG. 1.

Figure 1:
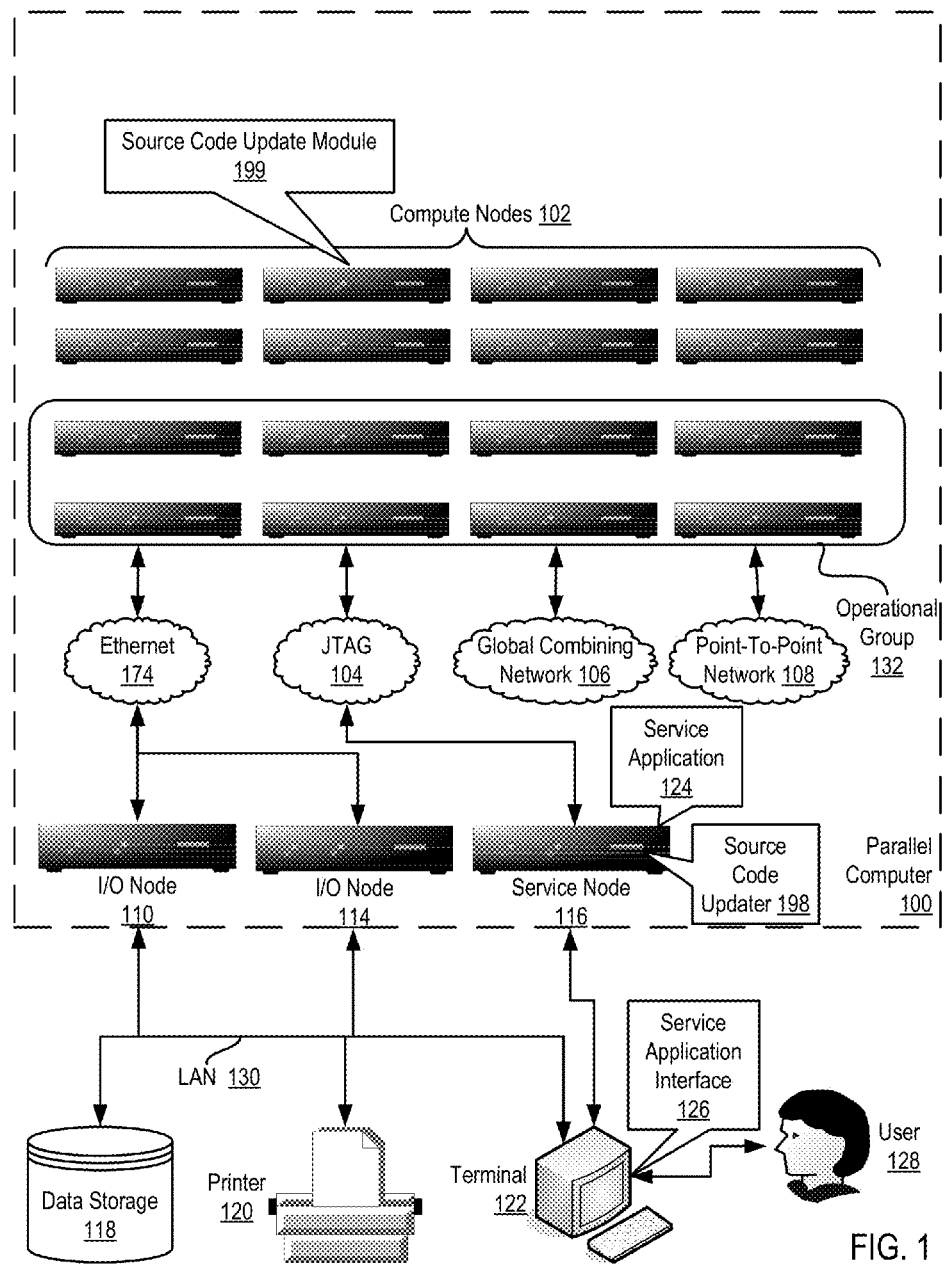
FIG. 1 illustrates an example system for implementing updates to source code executing on a plurality of compute nodes according to embodiments of the present invention.

FIG. 1 illustrates an example system for implementing updates to source code executing on a plurality of compute nodes according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122). The service node (116) also includes a source code updater (198) that is configured to broadcast update-notification messages to each compute node of the plurality of compute nodes according to embodiments of the present invention. The source code updater (198) may also include the updated source code for distribution to each compute node or alternatively, the updated source code may be stored at another location for retrieval by the compute nodes.

In a particular embodiment, the source code updater (198) is configured to keep track of which versions of source code each of the compute nodes is using and is configured to determine when each of the compute nodes has completed an update. In response to determining that each compute node has updated their source code, the source code updater (198) may transmit an update-complete message. As will be explained in greater detail below, in response to receiving the update-complete message, a compute node may drop a distribution barrier and resume execution of the source code.

The parallel computer (100) of FIG. 1 operates generally for implementing updates to source code executing on a plurality of compute nodes in accordance with embodiments of the present invention. To implement updates to source code, each compute node of the plurality of compute nodes (102) may include a source code update module (199). The source code update module (199) of FIG. 1 includes computer program instructions that when executed by a processor of the compute node causes the compute node to carry out the step of: receiving from a source code updater, by a compute node, a broadcast update-notification message indicating there is an update to the source code executing on the plurality of compute nodes. A broadcast update-notification message is a message that is broadcast from the source code update (198) to each of the compute nodes (102). The update-notification message indicates that an update to source code executing on the compute node is available.

The source code update module (199) also includes computer program instructions that when executed by a processor causes a compute node to carry out the steps of: implementing, in response to receiving the update-notification message, by the computer node, a distributed barrier on the compute node; halting, based on the distributed barrier, by the compute node, execution of the source code at a particular location within the source code; and updating in-place, based on the distributed barrier, by the compute node, the source code. A distributed barrier is a type of operation that controls the implementation of updates to the source code. That is, the distributed barrier acts as a stopping or collecting point for all of the compute nodes to gather before proceeding with a particular step in the updating process. The location of the stopping point may be set based on the type of update, the type of source code being updated, the configuration of the compute nodes, and the types of processes or applications being executed by the compute nodes. For example, in one configuration, the distributed barrier may stop the update process at all of the compute nodes at a point after updating, but before resuming execution of the source code. In this example, each of the compute nodes will have updated the source code before any of the compute nodes will be allowed by the distributed barrier to resume execution of the source code. As another example, in another configuration, the distributed barrier may stop the update process at a point before all of the compute nodes have started updating the source code. In this example, the compute nodes will indicate when they are ready to begin updating the source code and all of the compute nodes will wait until every compute node is ready to update.

The computer program instructions for updating in-place, based on the distributed barrier, by the compute node, the source code include retaining workpiece data in memory of the compute node. Workpiece data corresponds to the execution of the source code. Examples of workpiece data may include data generated during execution of the source code; state of variables, pointers, indexes, and other execution data that will occur to those of skill in the art.

The source code update module (199) also includes computer program instructions that when executed by a processor causes the compute node to carry out the step of: resuming with the retained workpiece data, based on completion of the updating of the source code, by the compute node, execution of the source code at the particular location within the source code where execution was halted. That is, the source code update module is configured to allow a compute node to resume execution immediately where the compute node halted execution to update the source code.

Implementing updates to source code executing on a plurality of compute nodes according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters.

Figure 2:
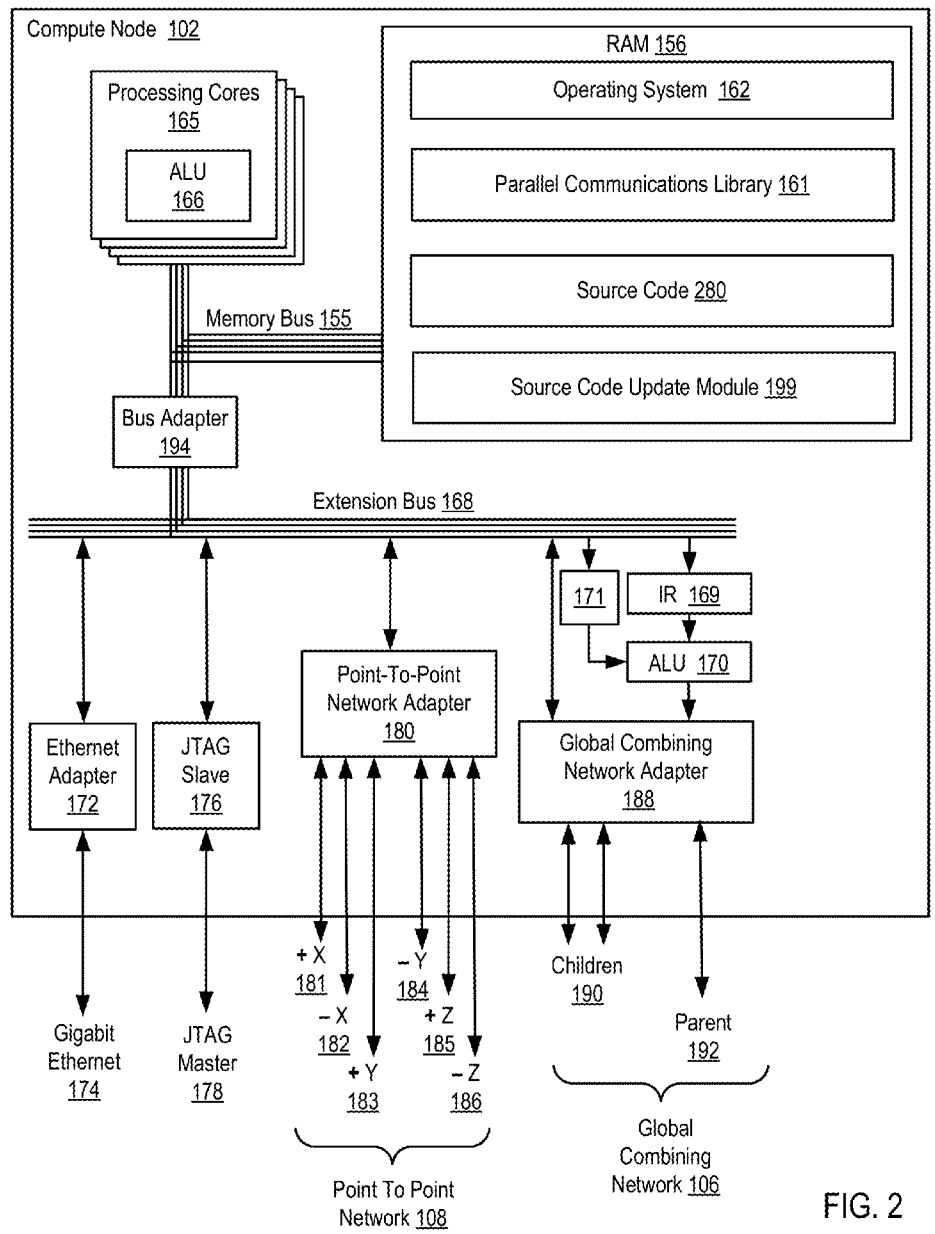
FIG. 2 sets forth a block diagram of an example compute node useful in a parallel computer capable of implementing updates to source code executing on a plurality of compute nodes according to embodiments of the present invention.

For further explanation, FIG. 2 sets forth a block diagram of an example compute node (102) useful in a parallel computer capable of implementing updates to source code executing on a plurality of compute nodes according to embodiments of the present invention. The compute node (102) of FIG. 2 includes a plurality of processing cores (165) as well as RAM (156). The processing cores (165) of FIG.

2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an application (226). The application (226) in the example of FIG. 2 may be configured as one instance of a parallel application with other instances executing amongst a plurality of compute nodes organized into an operational group. The application (226) in the example of FIG. 2 is configured for implementing updates to source code executing on a plurality of compute nodes in accordance with embodiments of the present invention. The application (226) in the example of FIG. 2 can implement updates to source code executing on a plurality of compute nodes in accordance with embodiments of the present invention by carrying out the steps of: receiving from a source code updater, by a compute node, a broadcast update-notification message indicating there is an update to the source code executing on the plurality of compute nodes; in response to receiving the update-notification message, implementing, by the computer node, a distributed barrier on the compute node, the distributed barrier controlling implementation of updates to the source code; based on the distributed barrier, halting, by the compute node, execution of the source code at a particular location within the source code; based on the distributed barrier, updating in-place, by the compute node, the source code including retaining workpiece data in memory of the compute node, the workpiece data corresponding to the execution of the source code; and based on completion of the updating of the source code, resuming with the retained workpiece data, by the compute node, execution of the source code at the particular location within the source code where execution was halted.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus capable of implementing updates to source code executing on a plurality of compute nodes include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems capable of implementing updates to source code executing on a plurality of compute nodes according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
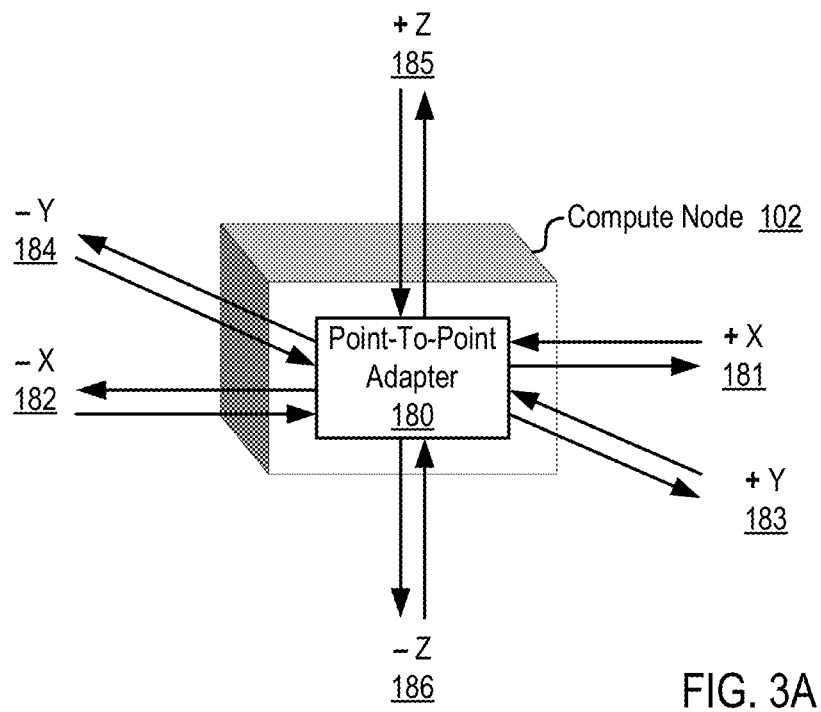
FIG. 3A sets forth a block diagram of an example Point-To-Point Adapter useful in systems for implementing updates to source code executing on a plurality of compute nodes according to embodiments of the present invention.

For further explanation, FIG. 3A sets forth a block diagram of an example Point-To-Point Adapter (180) useful in systems capable of implementing updates to source code executing on a plurality of compute nodes according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
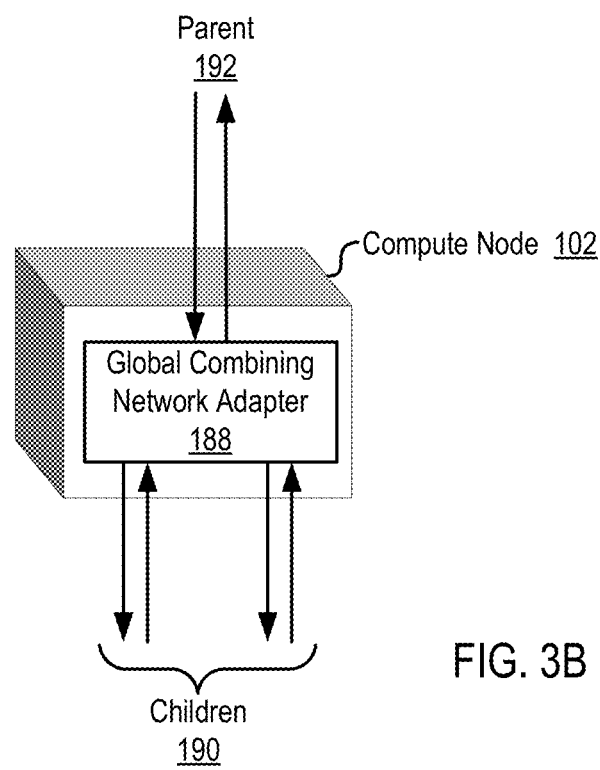
FIG. 3B sets forth a block diagram of an example Global Combining Network Adapter useful in systems for implementing updates to source code executing on a plurality of compute nodes according to embodiments of the present invention.

For further explanation, FIG. 3B sets forth a block diagram of an example Global Combining Network Adapter (188) useful in systems capable of implementing updates to source code executing on a plurality of compute nodes according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
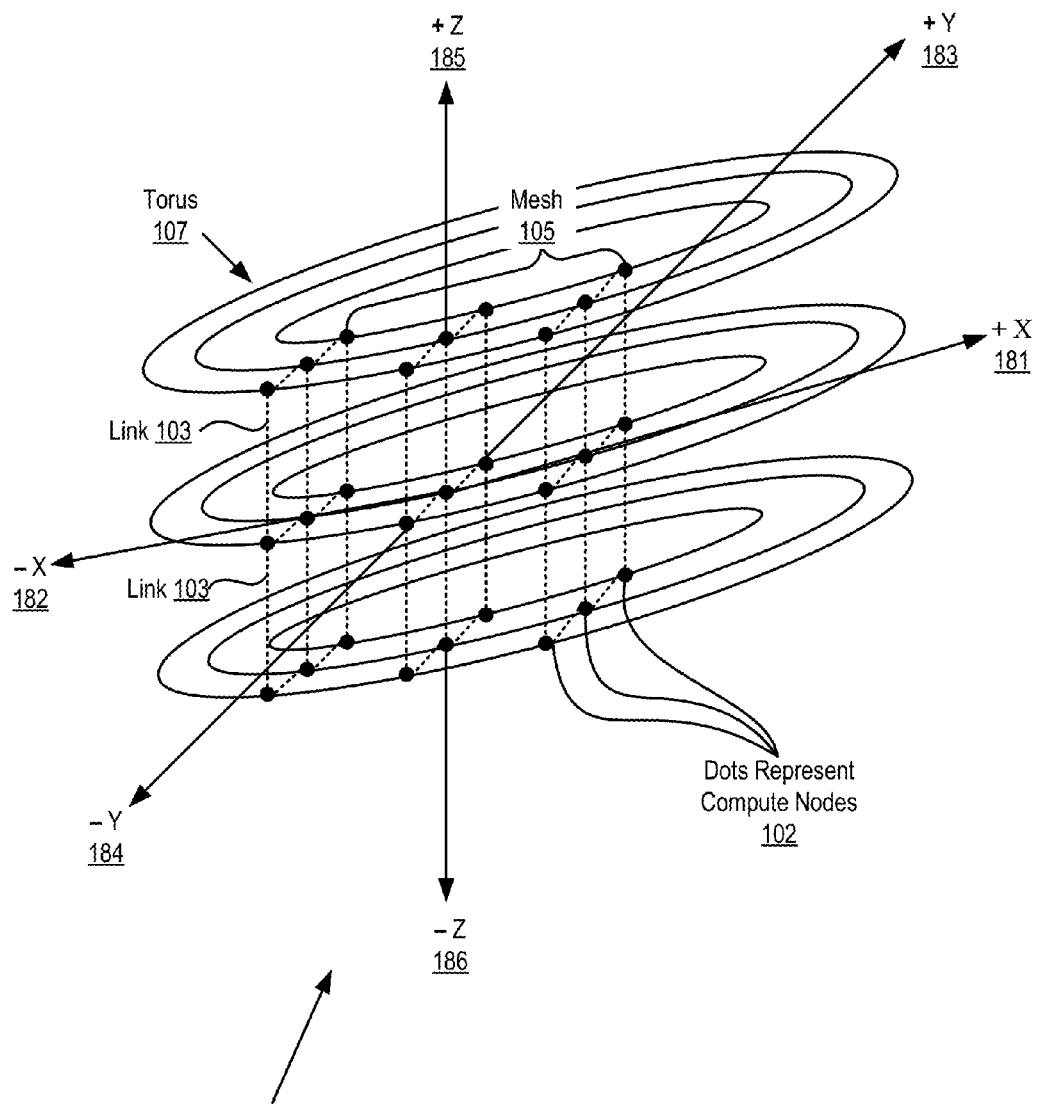
FIG. 4 sets forth a line drawing illustrating an example data communications network optimized for point-to-point operations useful in systems capable of implementing updates to source code executing on a plurality of compute nodes according to embodiments of the present invention.

For further explanation, FIG. 4 sets forth a line drawing illustrating an example data communications network (108) optimized for point-to-point operations useful in systems capable of implementing updates to source code executing on a plurality of compute nodes according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in implementing updates to source code executing on a plurality of compute nodes in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in implementing updates to source code executing on a plurality of compute nodes in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
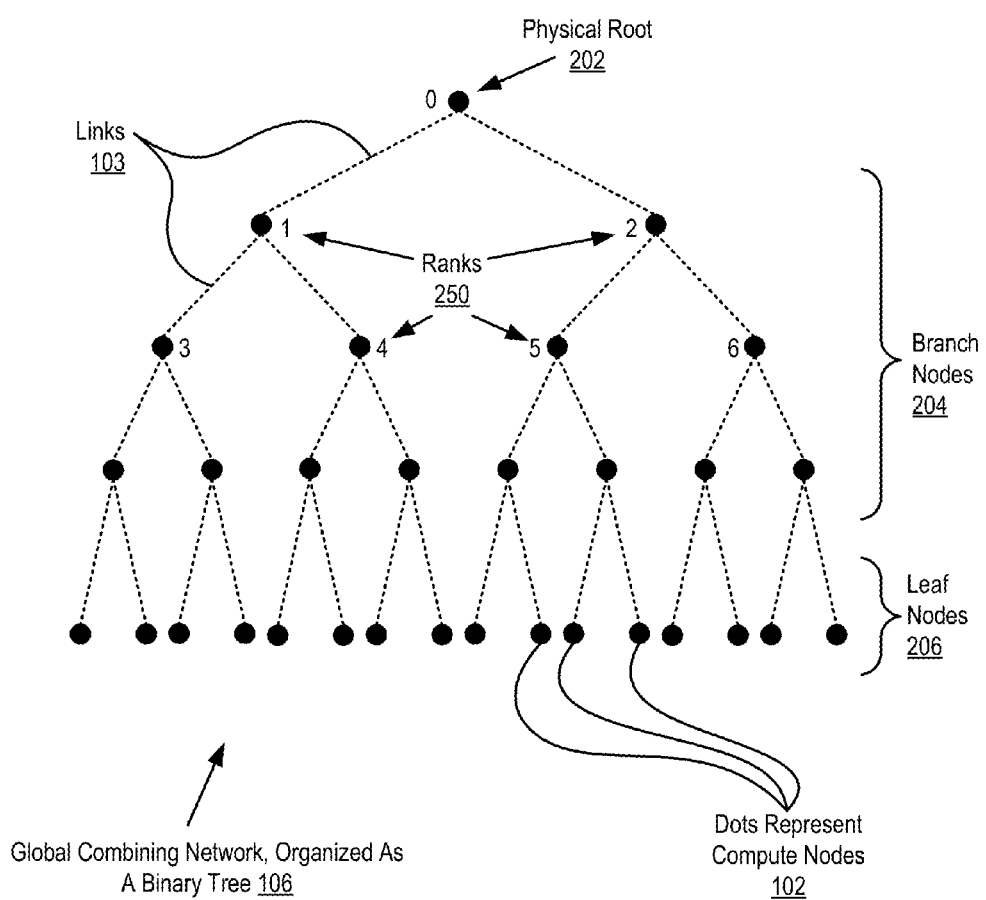
FIG. 5 sets forth a line drawing illustrating an example global combining network useful in systems capable of implementing updates to source code executing on a plurality of compute nodes according to embodiments of the present invention.

For further explanation, FIG. 5 sets forth a line drawing illustrating an example global combining network (106) useful in systems capable of implementing updates to source code executing on a plurality of compute nodes according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in implementing updates to source code executing on a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
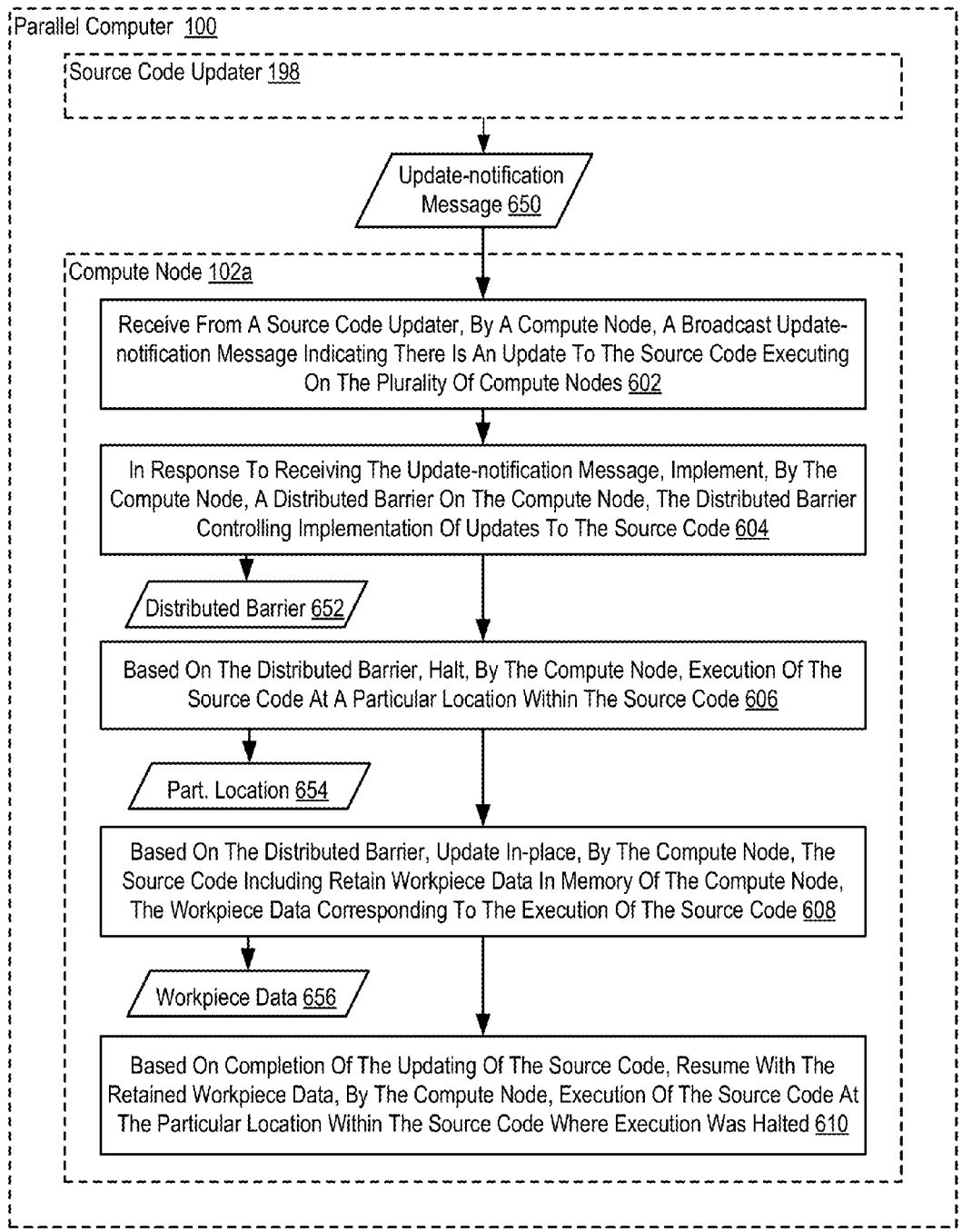
FIG. 6 sets forth a flow chart illustrating an exemplary method for implementing updates to source code executing on a plurality of compute nodes according to embodiments of the present invention.

For further explanation, FIG. 6 sets forth a flow chart illustrating an exemplary method for implementing updates to source code executing on a plurality of compute nodes according to embodiments of the present invention. The method of FIG. 6 includes receiving (602) from a source code updater (198), by a compute node (102*a*) of the distributed processing system, a broadcast update-notification message (650) indicating there is an update to the source code (280) executing on the plurality of compute nodes (102). In the example of FIG. 6, the update-notification message is an active message that includes an all reduce operation for gathering ready-update messages from each of the plurality of compute nodes. Receiving (602) from a source code updater (198), by a compute node (102*a*) of the distributed processing system, a broadcast update-notification message (650) indicating there is an update to the source code (280) executing on the plurality of compute nodes (102) may be carried out by receiving a message via a Joint Test Action Group ('JTAG') network coupling the service node (116) and the compute nodes (102).

The method of FIG. 6 also includes in response to receiving the update-notification message (650), implementing (604), by the computer node (102*a*), a distributed barrier (652) on the compute node (102*a*). The distributed barrier (652) controls implementation of updates to the source code (280). Implementing (604), by the computer node (102*a*), a distributed barrier (652) on the compute node (102*a*) may be carried out by executing a barrier operation; and executing a system interrupt.

The method of FIG. 6 includes halting (606), based on the distributed barrier (652), by the compute node (102*a*), execution of the source code (280) at a particular location (654) within the source code (280). Halting (606), based on the distributed barrier (652), by the compute node (102*a*), execution of the source code (280) at a particular location (654) within the source code (280) may be carried out by stopping execution of the source code.

The method of FIG. 6 also includes updating in-place (608), based on the distributed barrier (652), by the compute node (102*a*), the source code (280) including retaining workpiece data (656) in memory (156) of the compute node (102*a*). In the example of FIG. 6, the workpiece data (656) corresponds to the execution of the source code (280). Updating in-place (608), based on the distributed barrier (652), by the compute node (102*a*), the source code (280) including retaining workpiece data (656) in memory (156) of the compute node (102*a*) may be carried out by storing variables, pointers, register contents associated with execution of source code; and storing location of pointer of last source code execution; retrieving the updated source code from the source code updater (198) or another location; and storing the updated source code within the compute node.

The method of FIG. 6 also includes resuming (610) with the retained workpiece data (656), based on completion of the updating of the source code (280), by the compute node (102*a*), execution of the source code (280) at the particular location (654) within the source code (280) where execution was halted. Resuming (610) with the retained workpiece data (656), based on completion of the updating of the source code (280), by the compute node (102*a*), execution of the source code (280) at the particular location (654) within the source code (280) where execution was halted may be carried out by retrieving from storage, pointers, register contents, variables, and other workpiece data; retrieving the location of the last executed line of source code; and resuming execution at the stored location.

Figure 7:
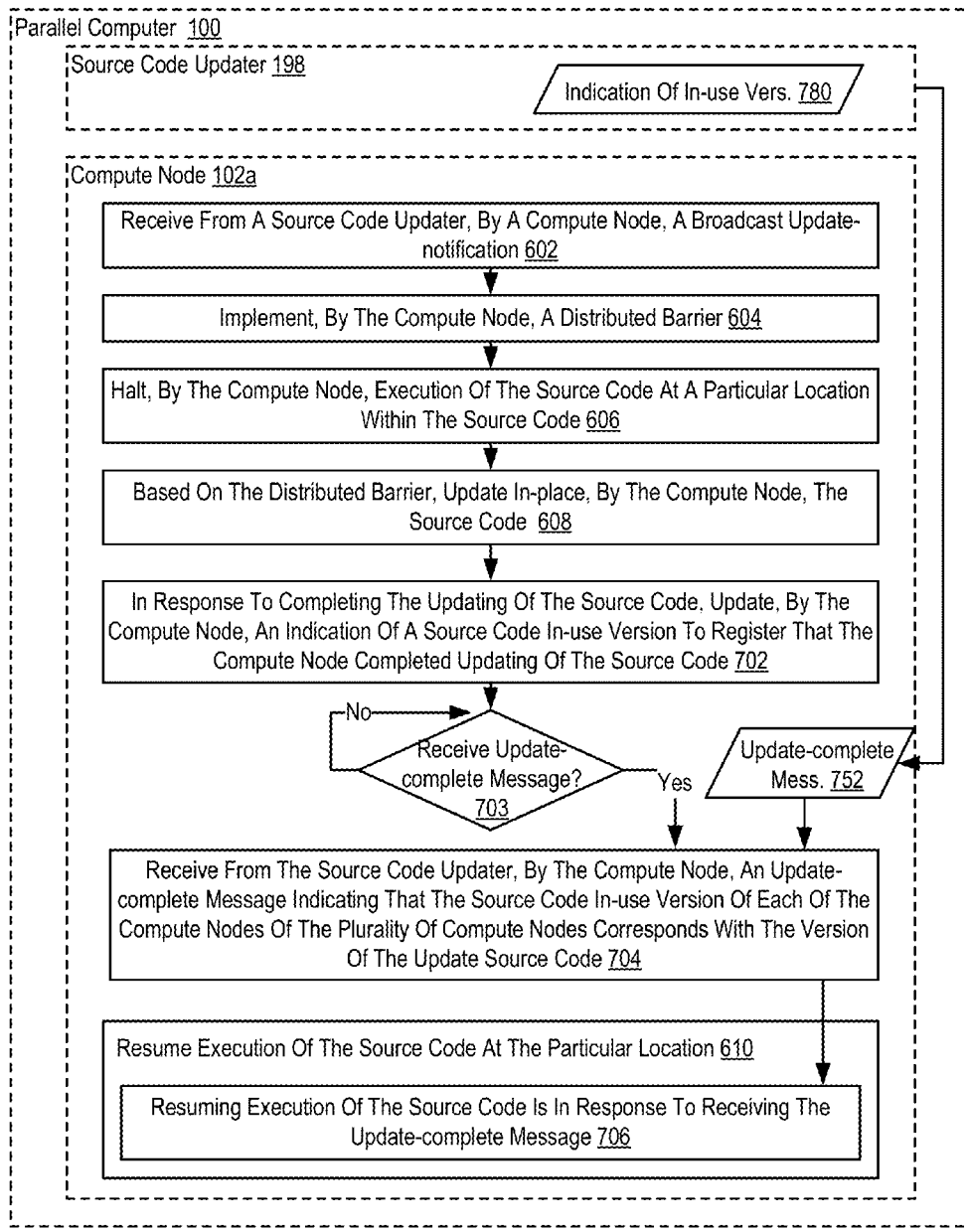
FIG. 7 sets forth a flow chart illustrating a further exemplary method for implementing updates to source code executing on a plurality of compute nodes according to embodiments of the present invention.

For further explanation, FIG. 7 sets forth a flow chart illustrating a further exemplary method for implementing updates to source code executing on a plurality of compute nodes according to embodiments of the present invention. The method of FIG. 7 is similar to the method of FIG. 6 in that the method of FIG. 7 as includes receiving (602) a broadcast update-notification message (650); implementing (604) a distributed barrier (652) on the compute node (102a) in response to receiving the update-notification message (650); halting (606) based on the distributed barrier (652) execution of the source code (280) at a particular location (654) within the source code (280); updating in-place (608) based on the distributed barrier (652) the source code (280); and resuming (610) based on completion of the updating of the source code (280), execution of the source code (280) at the particular location (654) within the source code (280) where execution was halted.

In the example of FIG. 7, the implemented distributed barrier prevents the compute node from resuming execution of the source code until each compute node in the plurality of compute nodes has completed updating the source code. The method of FIG. 7 also includes updating (702), in response to completing the updating (608) of the source code (280), by the compute node (102a), an indication (780) of a source code in-use version to register that the compute node (102a) completed updating (608) of the source code (280). An indication of source code in-use version refers to a value indicating which version of source code that a compute node is executing. Updating (702), in response to completing the updating (608) of the source code (280), by the compute node (102a), an indication (780) of a source code in-use version to register that the compute node (102a) completed updating (608) of the source code (280) may be carried out by sending to the source code updater (198) a message to change the version of source code corresponding to the compute node. That is, the compute node tells the source code updater that the update of source code is complete.

The method of FIG. 7 includes receiving (704) from the source code updater (198), by the compute node (102a), an update-complete message (752) indicating that the source code in-use version of each of the compute nodes of the plurality of compute nodes (102) corresponds with the version of the updated source code. Receiving (704) from the source code updater (198), by the compute node (102a), an update-complete message (752) indicating that the source code in-use version of each of the compute nodes of the plurality of compute nodes (102) corresponds with the version of the updated source code may be carried out by receiving an indication from the source code updater (198) that every compute node has up-to-date source code and therefore resumption of execution may begin.

Figure 8:
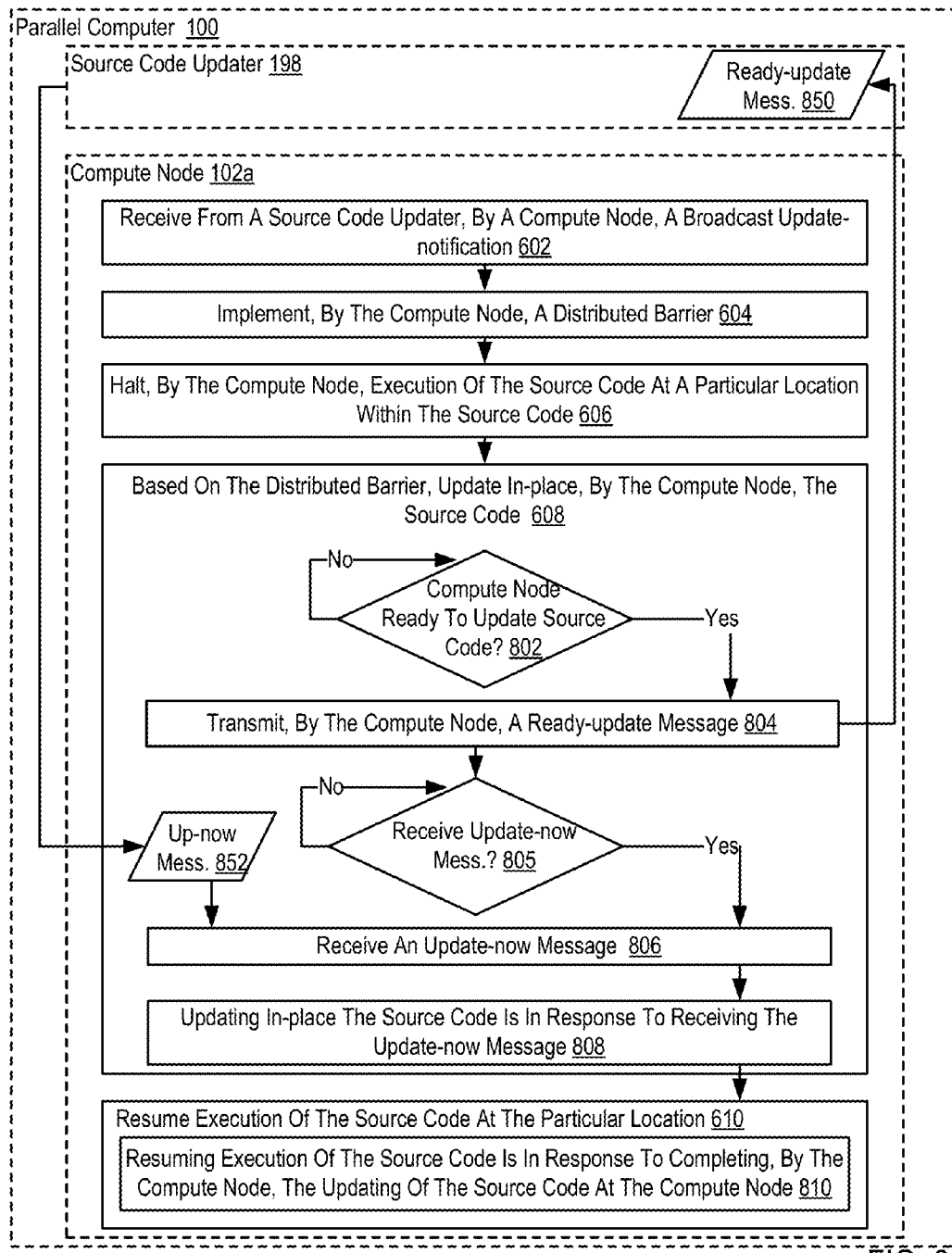
FIG. 8 sets forth a flow chart illustrating a further exemplary method for implementing updates to source code executing on a plurality of compute nodes according to embodiments of the present invention.

In the method of FIG. 8, resuming (610) based on completion of the updating of the source code (280), execution of the source code (280) at the particular location (654) within the source code (280) where execution was halted includes resuming (706) execution of the source code in response to receiving the update-complete message (752). Resuming (706) execution of the source code in response to receiving the update-complete message (752) may be carried out by starting execution of the updated source code from a stored starting location.

For further explanation, FIG. 8 sets forth a flow chart illustrating a further exemplary method for implementing updates to source code executing on a plurality of compute nodes according to embodiments of the present invention. The method of FIG. 8 is similar to the method of FIG. 6 in that the method of FIG. 8 as includes receiving (602) a broadcast update-notification message (650); implementing (604) a distributed barrier (652) on the compute node (102a) in response to receiving the update-notification message (650); halting (606) based on the distributed barrier (652) execution of the source code (280) at a particular location (654) within the source code (280); updating in-place (608) based on the distributed barrier (652) the source code (280); and resuming (610) based on completion of the updating of the source code (280), execution of the source code (280) at the particular location (654) within the source code (280) where execution was halted.

In the example of FIG. 8, the implemented distributed barrier prevents the compute node (102a) from updating (608) the source code (280) until each compute node of the plurality of compute nodes (102) have indicated a readiness to update the source code. The method of FIG. 8 includes determining (802), in response to receiving the update-notification message (852), by the compute node (102a), if the compute node (102a) is ready to update the source code (280). Determining (802), in response to receiving the update-notification message (852), by the compute node (102a), if the compute node (102a) is ready to update the source code (280) may be carried out by determining by the compute node if the execution of source code is interruptible; and when the compute node is ready to update, transmitting by the compute node, a message to the source code updater (198).

In the method of FIG. 8, if the compute node is ready to update the source code, the method continues with transmitting (804), by the compute node (102a), a ready-update message (850). Transmitting (804), by the compute node (102a), a ready-update message (850) may be carried out by transmitting a message to the source code updater (198) over the JTAG network (104).

The method of FIG. 8 also includes determining (805), by the compute node (102a), whether an update-now message (852) is received. Determining (805), by the compute node (102a), whether an update-now message (852) is received may be carried out by querying a queue that stores the update-now messages to determine if the update-now message was received.

The method of FIG. 8 includes receiving (806) from the source code updater (198), by the compute node (102a), an update-now message (852) that indicates each of the compute nodes in the plurality of compute nodes (102) are ready to update the source code. Receiving (806) from the source code updater (198), by the compute node (102a), an update-now message (852) that indicates each of the compute nodes in the plurality of compute nodes (102) are ready to update the source code may be carried out by receiving a message from the source code updater indicating that all of the compute nodes are ready to update.

In the method of FIG. 8, updating in-place (608) the source code includes updating in-place (808) the source code in response to receiving the update-now message (852). That is, in the example of FIG. 8, the updating of the source code at the compute node (102a) takes place in response to the compute node (102a) receiving the update-now message (852). Updating in-place (808) the source code in response to receiving the update-now message (852) may be carried out by storing variables, pointers, register contents associated with execution of source code; and storing location of pointer of last execution within source code; retrieving the updated source code from the source code updater (198) or another location; and storing the updated source code within the compute node.

In the method of FIG. 8, resuming (610) based on completion of the updating of the source code (280), execution of the source code (280) at the particular location (654) within the source code (280) where execution was halted includes resuming (810) execution of the source code is in response to completing, by the compute node, the updating of the source code at the compute node. Resuming (810) execution of the source code is in response to completing, by the compute node, the updating of the source code at the compute node may be carried out by starting execution of the updated source code from a stored starting location.

Exemplary embodiments of the present invention are described largely in the context of a fully functional computer system for implementing updates to source code executing on a plurality of compute nodes. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of implementing updates to source code executing on a plurality of compute nodes, the method comprising:
    receiving from a source code updater, by a compute node, a broadcast update-notification message indicating there is an update to the source code executing on the plurality of compute nodes;
    in response to receiving the update-notification message, implementing, by the computer node, a distributed barrier on the compute node, the distributed barrier controlling implementation of updates to the source code, wherein the distributed barrier comprises instructions for the plurality compute nodes to gather at a particular step in the implementation of updates to the source code;
    based on the distributed barrier, halting, by the compute node, execution of the source code at a particular location within the source code, wherein all of the plurality of compute nodes halt execution of the source code based on the distributed barrier, wherein the implemented distributed barrier prevents the compute node from resuming execution of the source code until each compute node in the plurality of compute nodes has completed updating the source code;
    receiving by the compute node from the source code updater an update-now message that indicates each of the compute nodes in the plurality of compute nodes are ready to update the source code;
    based on the distributed barrier, updating in-place, by the compute node, the source code including retaining workpiece data in memory of the compute node, the workpiece data corresponding to the execution of the source code;
    wherein the workpiece data include state of variables, pointers, indexes, and other execution data generated during execution of the source code;
    in response to completing the updating of the source code, updating, by the compute node, an indication of a source code in-use version to register that the compute node completed updating of the source code by sending to the source code updater a message to change a version of source code corresponding to the compute node;
    receiving by the compute node from the source code updater an update-complete message indicating that the source code in-use version of each of the compute nodes of the plurality of compute nodes corresponds with a version of the updated source code; and
    in response to receiving the update-complete message, resuming with the retained workpiece data, by the compute node, execution of the source code at the particular location within the source code where execution was halted, wherein upon resuming, all of the plurality of compute nodes resume execution of the source code.

2. The method of claim 1 wherein the implemented distributed barrier prevents the compute node from updating the source code until each compute node of the plurality of compute nodes have indicated a readiness to update the source code.

3. The method of claim 2 further comprising:
    in response to receiving the update-notification message, determining, by the compute node, if the compute node is ready to update the source code;
    if the compute node is ready to update the source code, transmitting, by the compute node, a ready-update message;
    wherein updating in-place the source code is in response to receiving the update-now message; and
    wherein resuming execution of the source code is in response to completing, by the compute node, the updating of the source code at the compute node.

4. The method of claim 3, wherein the update-notification message is an active message that includes an all reduce operation for gathering ready-update messages from each of the plurality of compute nodes.

5. A method of implementing updates to source code executing on a plurality of compute nodes, the method comprising:
    receiving from a source code updater, by a compute node, a broadcast update notification message indicating there is an update to the source code executing on the plurality of compute nodes;
    in response to receiving the update-notification message, implementing, by the computer node, a distributed barrier on the compute node, the distributed barrier controlling implementation of updates to the source code, wherein the distributed barrier comprises instructions for the plurality compute nodes to gather at a particular step in the implementation of updates to the source code;
    based on the distributed barrier, halting, by the compute node, execution of the source code at a particular location within the source code, wherein all of the plurality of compute nodes halt execution of the source code based on the distributed barrier, wherein the implemented distributed barrier prevents the compute node from resuming execution of the source code until each compute node in the plurality of compute nodes has completed updating the source code;
    receiving by the compute node from the source code updater an update-now message that indicates each of the compute nodes in the plurality of compute nodes are ready to update the source code;

based on the distributed barrier, updating in-place, by the compute node, the source code including retaining workpiece data in memory of the compute node, the workpiece data corresponding to the execution of the source code;

wherein the workpiece data include state of variables, pointers, indexes, and other execution data generated during execution of the source code;

in response to completing the updating of the source code, updating, by the compute node, an indication of a source code in-use version to register that the compute node completed updating of the source code by sending to the source code updater a message to change a version of source code corresponding to the compute node;

receiving by the compute node from the source code updater an update-complete message indicating that the source code in-use version of each of the compute nodes of the plurality of compute nodes corresponds with a version of the updated source code;

in response to receiving the update-complete message, resuming with the retained workpiece data, by the compute node, execution of the source code at the particular location within the source code where execution was halted, wherein upon resuming, all of the plurality of compute nodes resume execution of the source code;

wherein the implemented distributed barrier prevents the compute node from updating the source code until each compute node of the plurality of compute nodes have indicated a readiness to update the source code;

in response to receiving the update-notification message, determining, by the compute node, if the compute node is ready to update the source code;

if the compute node is ready to update the source code, transmitting, by the compute node, a ready-update message;

wherein updating in-place the source code is in response to receiving the update-now message; and wherein resuming execution of the source code is in response to completing, by the compute node, the updating of the source code at the compute node.

* * * * *